US011474910B2

United States Patent
Zhong et al.

(10) Patent No.: US 11,474,910 B2
(45) Date of Patent: Oct. 18, 2022

(54) METHOD, DEVICE AND COMPUTER PROGRAM PRODUCT TO BACKUP DATA

(71) Applicant: EMC IP Holding Company LLC, Hopkinton, MA (US)

(72) Inventors: Xin Zhong, Beijing (CN); Qinghua Ling, Beijing (CN); Yan Shao, Beijing (CN); Jianbao Li, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 127 days.

(21) Appl. No.: 16/878,954

(22) Filed: May 20, 2020

(65) Prior Publication Data

US 2021/0133045 A1    May 6, 2021

(30) Foreign Application Priority Data

Oct. 30, 2019   (CN) .......................... 201911048097.2

(51) Int. Cl.
*G06F 11/14*     (2006.01)
*H04L 67/1097*   (2022.01)
*H04L 67/56*     (2022.01)

(52) U.S. Cl.
CPC ...... *G06F 11/1464* (2013.01); *G06F 11/1469* (2013.01); *H04L 67/1097* (2013.01); *H04L 67/56* (2022.05)

(58) Field of Classification Search
CPC ............. G06F 11/1464; G06F 11/1469; H04L 67/1097; H04L 67/28
See application file for complete search history.

(56) References Cited

U.S. PATENT DOCUMENTS

| | | | |
|---|---|---|---|
| 8,135,861 B1 * | 3/2012 | Bachu ................. | G06F 11/1458 709/246 |
| 8,381,213 B1 | 2/2013 | Naamad et al. | |
| 8,706,833 B1 | 4/2014 | Bergant et al. | |
| 8,707,308 B1 | 4/2014 | Naamad et al. | |
| 8,719,286 B1 | 5/2014 | Xing et al. | |
| 8,751,515 B1 | 6/2014 | Xing et al. | |
| 9,026,512 B2 | 5/2015 | Kaushik et al. | |
| 9,292,327 B1 | 3/2016 | Von Thenen et al. | |
| 9,501,487 B1 | 11/2016 | Yuan et al. | |

(Continued)

OTHER PUBLICATIONS

R. Stager, Network Data Management Protocol, Network Working Group, Sep. 1997 (Year: 1997).*

*Primary Examiner* — Wing F Chan
*Assistant Examiner* — Billy H Ng
(74) *Attorney, Agent, or Firm* — BainwoodHuang (57) ABSTRACT

Techniques for backing up data involve receiving, by a proxy server and from an application, a backup request comprising a backup path. The techniques further involve determining a target server associated with backup request according to the backup path, and the proxy server and the target server share the same storage processor. The techniques further involve backing up a file in the target server associated with the backup path. Along these lines, a dedicated proxy server may be provided, and the proxy server may be used to handle backup requests for all file systems on the storage processor. Then, the backup requests can be forwarded to the corresponding target servers through a virtual file system without configuring corresponding Internet protocol (IP) address for each target server.

20 Claims, 5 Drawing Sheets

(56) References Cited

U.S. PATENT DOCUMENTS

| | | |
|---|---|---|
| 10,558,372 B1 | 2/2020 | Radhakrishna et al. |
| 10,649,852 B1 | 5/2020 | Starling et al. |
| 10,664,357 B1 | 5/2020 | Mallik et al. |
| 10,915,411 B2 | 2/2021 | Parambil et al. |
| 2006/0080370 A1* | 4/2006 | Torii .................. G06F 16/1827 |
| 2007/0185915 A1* | 8/2007 | Prahlad ................ G06F 16/134 |
| 2007/0206497 A1* | 9/2007 | Plamondon ........... H04L 1/1887 |
| | | 370/231 |
| 2019/0278669 A1* | 9/2019 | Mueller-Wicke ............................ |
| | | G06F 11/1451 |

\* cited by examiner

(12) United States Patent

METHOD, DEVICE AND COMPUTER PROGRAM PRODUCT TO BACKUP DATA

CROSS-REFERENCE TO RELATED APPLICATION

This application claims priority to Chinese Patent Application No. CN201911048097.2, on file at the China National Intellectual Property Administration (CNIPA), having a filing date of Oct. 30, 2019, and having "METHOD, DEVICE AND COMPUTER PROGRAM PRODUCT FOR BACKUPING DATA" as a title, the contents and teachings of which are herein incorporated by reference in their entirety.

FIELD

Embodiments of the present disclosure generally relate to the technical field of data storage, and more specifically to a method, system and computer program product for backing up data.

BACKGROUND

A network-attached storage (NAS) is a device connected to a network and has a data storage function, also referred to as a "network storage", and it is a dedicated data storage server. The NAS uses a server equipped with one or more dedicated disks to store data and shares these data with a large number of clients connected to the network. The NAS usually regards data as a file. The NAS may use some file-based standard protocols, such as a Network File System (NFS), a Server Message Block (SMB), a Common Internet File System (CIFS), and other file transfer protocols (AFP). The NAS has many advantages, such as a good horizontal expansion function, high performance, easy setup, strong accessibility and high fault tolerance.

The NAS server may include one or more file systems (FS). The file system refers to a system for storing and managing files. Generally, from a system perspective, the file system is a system that organizes and allocates a space of a file storage device, and is responsible for storing files and protecting and searching for the stored files. Specifically, it is responsible for creating files for users, writing, reading, modifying, and dumping files, controlling access to the files, and revoking the files when users do not use them any longer. Generally, a plurality of file systems may share the same storage pool, where the storage pool includes a certain number of storage resources, such as disks.

SUMMARY

Embodiments of the present disclosure provide a method, system and computer program product for backing up data.

According to one aspect of the present disclosure, there is provided a method for backing up data. The method includes receiving, by a proxy server and from an application, a backup request including a backup path; and determining, by the proxy server, a target server associated with the backup request according to the backup path, where the proxy server and the target server share the same storage processor. The method further includes enabling to back up a file in the target server associated with the backup path.

According to another aspect of the present disclosure, there is provided a storage system. The system includes a processing unit and a memory, where the memory is coupled to the processing unit and stores instructions thereon. The instructions, when executed by the processing unit, perform the acts including: receiving, by a proxy server and from an application, a backup request including a backup path; and determining, by the proxy server, a target server associated with the backup request according to the backup path, where the proxy server and the target server share the same storage processor. The method further includes enabling to back up a file in the target server associated with the backup path.

According to a further aspect of the present disclosure, there is provided a computer program product that is tangibly stored on a non-transitory computer readable medium and includes machine-executable instructions. The machine-executable instructions, when executed, cause a computer to execute the method or process according to embodiments of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other features, advantages and aspects of embodiments of the present disclosure will be made more apparent by describing the present disclosure in more detail with reference to figures. In the figures, the same or like reference signs represent the same or like elements, wherein.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described below in more detail with reference to figures. Although figures show preferred embodiments of the present disclosure, it should be appreciated that the present disclosure may be implemented in various forms and should not be limited by embodiments stated herein. On the contrary, these embodiments are provided to make the present disclosure more apparent and complete, and to convey the scope of the present disclosure entirely to those skilled in the art.

As used herein, the term "includes" and its variants are to be read as open terms that mean "includes, but is not limited to." Unless otherwise specified, the term "or" represents "and/or". The term "based on" is to be read as "based at least in part on." The term "an implementation" is to be read as "at least one implementation." The term "another implementation" is to be read as "at least one other implementation." Terms "first" and "second" may refer to different or identical objects, unless otherwise it is explicitly specified that they refer to different objects.

The storage system usually has a data backup and recovery function. When data backup is performed, a Data Management Application (DMA) usually needs to be connected to the Internet Protocol (IP) address of the NAS server or physical data mover to back up a file system served by the NAS server or physical data mover. Therefore, the IP address of each NAS server or physical data mover needs to be configured in the DMA.

If the file system in the NAS server is to be backed up, the DMA needs to be connected to the IP address of the NAS server. There may be dozens or even hundreds of NAS servers in a storage system. It is necessary to, for each NAS server in the storage system, set a corresponding configuration in the DMA so as to back up all file systems in the storage system. Although this is one-off configuration work, an excessive number of configurations are prone to cause occurrence of errors and bring about potential maintenance issues.

In addition, a bigger challenge arises for customers with replication infrastructure set up for the storage system. Usually, these customers prefer to backup data from replicated file systems on the standby site, so they may shift the backup workload from the production site to the standby site. However, replicated NAS servers on the standby site might not be configured with an IP address. On the contrary, customers only provide the IP address on the replicated NAS servers to provide access to the replicated file systems in certain circumstances such as DR testing. Therefore, to back up the replicated file systems through the replicated NAS server, customers must provision one dedicated IP for the NAS server. Considering one storage system might have tens or hundreds of NAS servers, provisioning so many IP addresses dedicated to data backup wastes the IP address resources.

In addition, traditionally, a backup request from a NAS server can only back up the file system served by this NAS server. The thread receiving the backup connection will only pass the working context to the backup engine threads. Therefore, the backup engine threads can only access the file systems served by the NAS server that owns the connection.

It can be seen that the traditional method requires tedious manual configuration and takes up a lot of IP address resources.

To this end, embodiments of the present disclosure propose a new backup solution for a proxy mode of a storage system. In embodiments of the present disclosure, a virtual file path in a virtual file system is introduced, a dedicated proxy server is disposed, and then a proxy server is used to handle backup requests for all file systems on a storage processor, and the backup requests can be forwarded to corresponding target servers through a virtual file system, without configuring a corresponding IP address for each target server. This not only reduces a tedious configuration process, but also saves the IP address resources. In addition, some embodiments of the present disclosure can also avoid using too many dedicated IPs for data backup on the standby site, while simplifying the tedious configuration on the DMA side.

Reference will be made below to FIG. 1 through FIG. 8 to describe the basic principle and several example implementations of the present disclosure with reference. It should be understood that these example embodiments are given only to enable those skilled in the art to better understand and implement the embodiments of the present disclosure without limiting embodiments of the present disclosure in any way.

Figure 1:
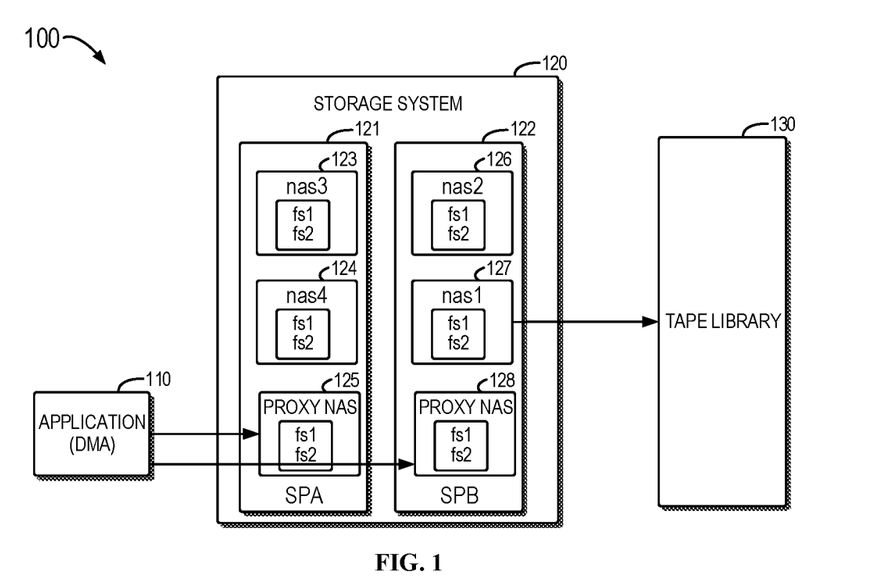
FIG. 1 shows a schematic diagram of an example backup environment according to embodiments of the present disclosure.

FIG. 1 shows a schematic diagram of an example backup environment 100 according to embodiments of the present disclosure. As shown in FIG. 1, the example backup environment 100 includes an application 110 (such as DMA), a storage system 120 and a tape library 130, and the application 110 may be installed on a user device. In some embodiments of the present disclosure, DMA is taken as an example of the application, but other types of applications may also be used in combination with the embodiments of the present disclosure. In some embodiments, the application 110 may communicate with the storage system 120 through a network data management protocol (NDMP). The NDMP is a protocol used by the DMA to initiate and control a backup operation in a storage array. The NDMP defines a network-based protocol and mechanism that may be used to control backup, restoring/recovery, and data transmission between memories.

As shown in FIG. 1, the storage system includes a dual-controller host, that is, two storage processors SPA 121 and SPB 122, and each SP may include a plurality of NAS servers. For example, the SPA 121 includes NAS servers 123, 124 and 125, and the SPA 122 includes NAS servers 126, 127 and 128. These NAS servers may be storage servers provided to an external host, and they may be virtual storage servers. Generally, in order to communicate with a certain NAS server, the application 110 needs to know the IP address of the target NAS server. In embodiment of the present disclosure, one NAS server in each SP may operate as a proxy server, and it may receive a backup request from the application 110, parse the NAS server name in the request, and then forward it to the corresponding NAS server. For example, the NAS server 125 acts as the NDMP proxy in the SPA 121, and the NAS server 128 acts as the NDMP proxy in the SPB 122. In this way, it is only necessary to configure relevant settings and the IP addresses of the proxy NAS server 125 and the proxy NAS server 128 in the application 110, which reduces the configuration workload and saves IP address resources.

As shown in FIG. 1, the proxy NAS server 125 will handle backup requests for all file systems in the SPA 121, and the proxy NAS server 128 will handle backup requests for all file systems in the SPB 122. In some embodiments, it is possible to set a proxy mode flag on each NAS server to indicate whether the NAS server enables the NDMP proxy mode. For a NAS server (such as proxy NAS server 128) enabling NDMP proxy mode, when it receives a backup request, it will parse the backup request and forward the backup request to the corresponding NAS server; and for a NAS server (such as NAS server 127) disenabling the NDMP proxy mode, additional processing is not needed.

Therefore, according to embodiments of the present disclosure, the DMA is enabled to back up a file system in one NAS server by connecting the IP address of another NAS server. In some embodiments, embodiments of the present disclosure may be an NDMP-based proxy mode, and the DMA is not aware of the existence of the NAS server intended for backup.

Figure 2:
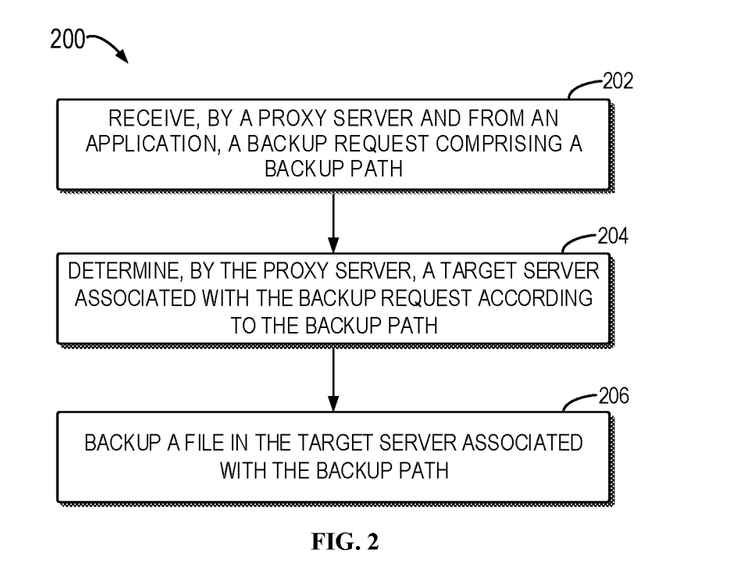
FIG. 2 shows a flowchart of a method for backing up data according to embodiments of the present disclosure.

FIG. 2 shows a flowchart of a method 200 for backing up data according to embodiments of the present disclosure. To better describe the method 200, the method 200 is described together with reference to the example environment 100 of FIG. 1.

At 202, the proxy server receives a backup request including a backup path from the application. For example, the proxy NAS server 128 as described with reference to FIG. 1 receives a backup request from the application 110, and the backup request includes a backup path of the virtual file system. The backup path may include a name of the specific target NAS server to which the backup request is directed, as well as the file system path therein.

At 204, the proxy server determines the target server to which the backup request is directed according to the backup path, where the proxy server and the target server share the same storage processor. For example, the proxy NAS server 128 parses the backup path to determine the target server that needs to be backed up, such as the NAS server 127, and both the proxy NAS server 128 and the NAS server 127 are on the SPB 122. In other words, each SP may set one of its NAS servers as the proxy server.

At 206, a file in the target server associated with the backup path is backed up. For example, the NAS server 127 is enabled to back up files in the related file system path. For example, all files in the file system fs1 may be backed up to the tape library 130. It may be seen that the application 110 may forward the backup request to the NAS server 127 through the proxy NAS server 128 without configuring the IP address of the NAS server 127, thereby reducing the configuration load at the application 110.

Therefore, according to the method 200 of embodiments of the present disclosure, it is possible to use a proxy server to handle backup requests for all file systems on a storage processor, and forward backup requests to the corresponding target servers through the virtual file system, without configuring a corresponding IP address for each target server. This not only reduces a tedious configuration process, but also saves the IP address resources.

Figure 3:
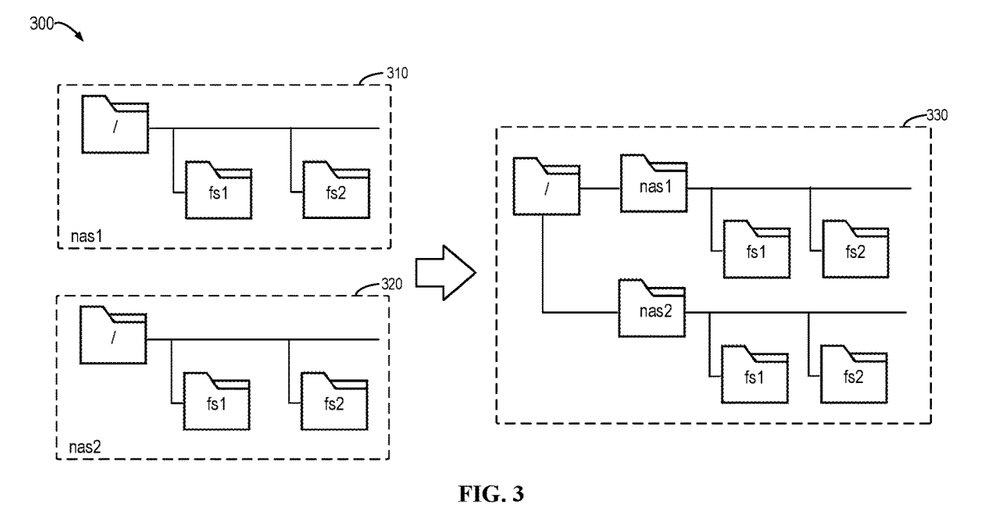
FIG. 3 shows a schematic diagram of a hierarchy of a file system according to embodiments of the present disclosure.

FIG. 3 shows a schematic diagram 300 of a hierarchy of a file system according to embodiments of the present disclosure. As shown in FIG. 3, blocks 310 and 320 respectively show a conventional file system hierarchy of NAS server nas1 and NAS server nas2, and block 330 shows a file system hierarchy using the NDMP proxy mode according to embodiments of the present disclosure.

The file systems in different NAS servers may have the same name (for example, the NAS server 126 and the NAS server 127 both include the file system fs1), so they cannot be distinguished only by the names of the file systems. Therefore, embodiments of the present disclosure proposes a DMA mechanism to unambiguously address a file system in the system through the proxy NAS. As shown in FIG. 3, it is possible to prefix the name (e.g., "nas1") of the NAS server to the name of a file system as the name of NAS server is unique across the whole system. Therefore, the NAS server 128 in proxy mode will expose file system hierarchy on the NDMP interface in the following way: one extra level of directories will be added under the root directory, with the names of respective NAS servers as the directory name. FIG. 3 illustrates a schematic diagram about how the file system hierarchy is consolidated and exposed by proxy NAS server on the NDMP interface. It is possible to prefix the name "nas1" to the file system in the NAS server nas1, and prefix the name "nas2" to the file system in the NAS server nas2. In this way, the corresponding target NAS server and the file path therein can be directly judged according to the path of the virtual file system.

Figure 4:
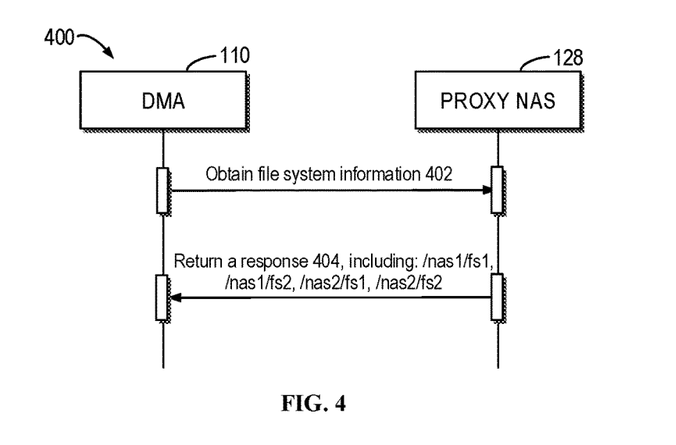
FIG. 4 shows a schematic diagram of file system listing in a proxy mode according to embodiments of the present disclosure.
Figure 5:
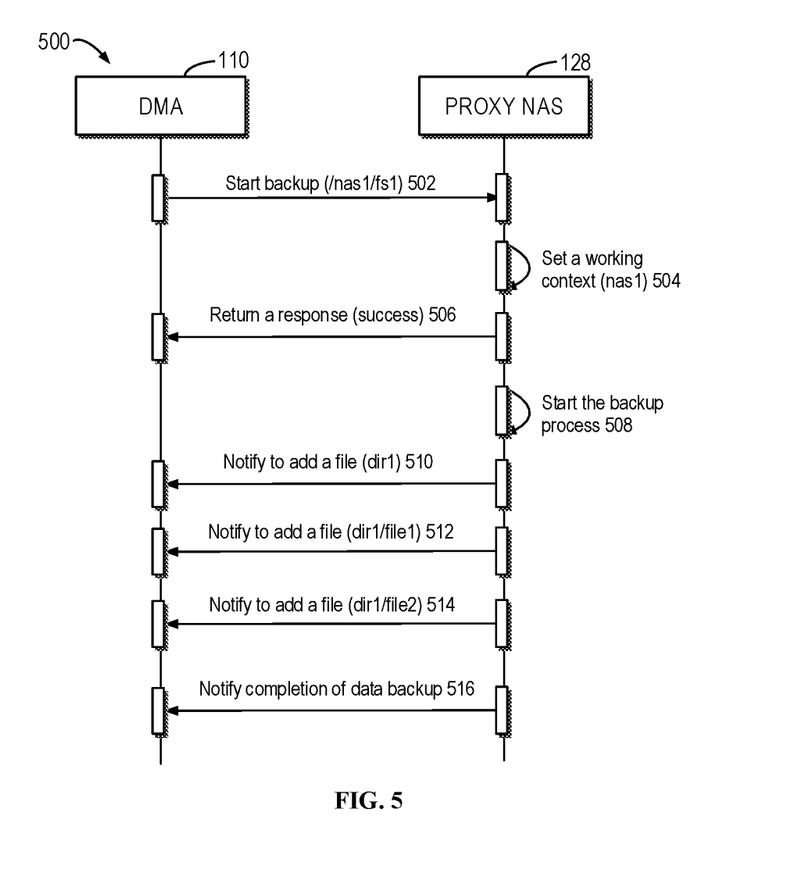
FIG. 5 shows a schematic diagram of file system backup in a proxy mode according to embodiments of the present disclosure.
Figure 6:
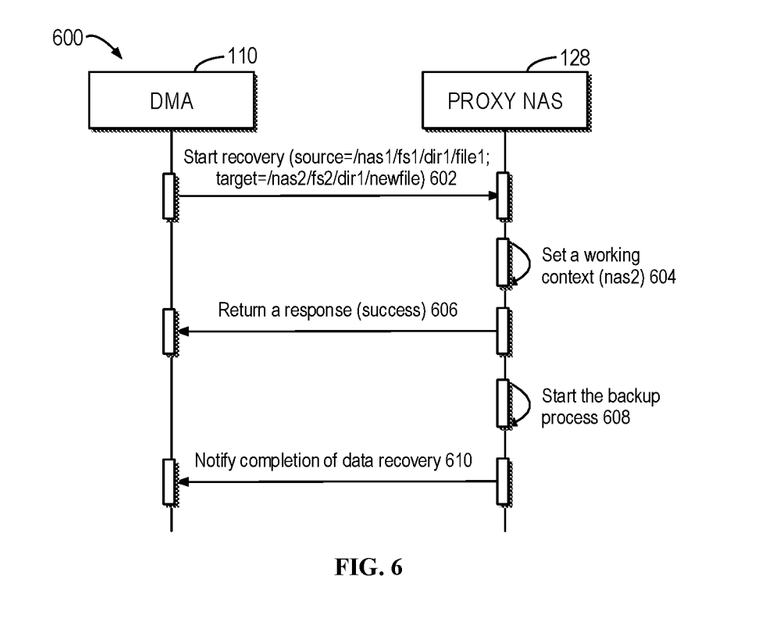
FIG. 6 shows a schematic diagram of file system recovery in a proxy mode according to embodiments of the present disclosure.
Figure 7:
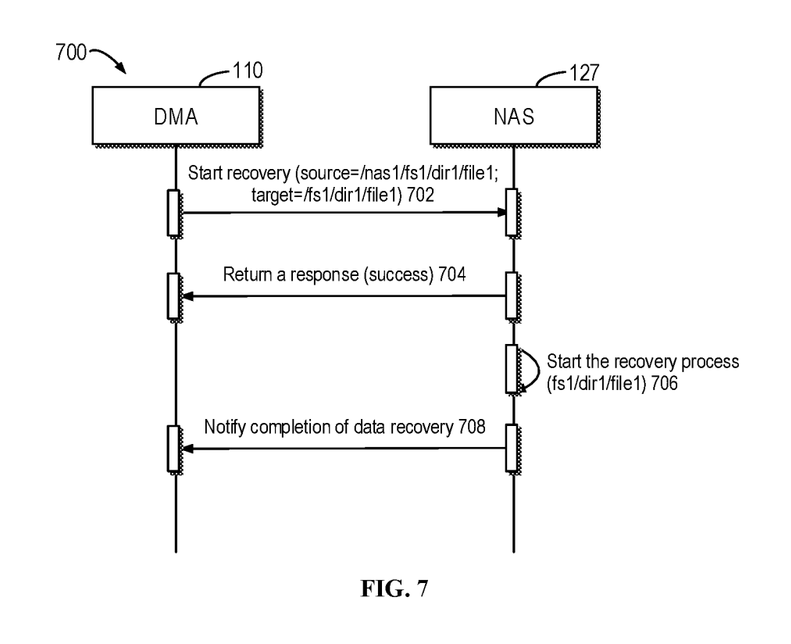
FIG. 7 shows a schematic diagram for directly recovering a file to a target server according to embodiments of the present disclosure.

The above changes to the file system hierarchy will directly affect the following three NDMP operations: the file system listing in the NDMP client settings (as shown in FIG. 4), the file system backup (as shown in FIG. 5), and the file system recovery (as shown in FIG. 6 and FIG. 7).

FIG. 4 shows a schematic diagram 400 of file system listing in a proxy mode according to embodiments of the present disclosure. At 402, the DMA 110 sends a request to the proxy NAS server 128 to obtain file system information available on the SPB where it resides, such as the message "NDMP_CONFIG_GET_FS_INFO ( )". At 404, the proxy NAS server 128 returns a response, that is, return a list of all file systems of the SPB where the proxy server resides, for example, "/nas1/fs1", "/nas1/fs2", "/nas2/fs1", "/nas2/fs2", and so on.

According to embodiments of the present disclosure, in order to back up a file system in a storage system, an administrator and/or user needs to set the proxy NAS server 128 as an NDMP client in the DMA 110. During this process, the DMA 110 will attempt to connect to the IP address of the proxy NAS server 128 to list all the file systems available in the NDMP client so that the administrator and/or user may select the file system for which he/she wants to set up a backup plan. The proxy NAS server 128 will return all file systems in the SPB where the proxy NAS server 128 resides.

FIG. 5 shows a schematic diagram 500 of file system backup in a proxy mode according to embodiments of the present disclosure. After the NDMP client is set in the DMA 110, the backup of the selected file system may be completed periodically or aperiodically if scheduled or on demand.

At 502, the DMA 110 sends a start backup message "NDMP_START_BACKUP" to the proxy NAS server 128 to start the backup operation. As shown in FIG. 5, the backup message includes "/nas1/fs1", which includes a file system path indicating a file system or a file system directory intended for backup. For the proxy NAS server 128 working in the NDMP proxy mode, it first parses the backup path in this particular format. The prefix or the first portion in the backup path will be parsed into the name of the target NAS server, namely, "nas1".

In order to back up the file system in the NAS server, the DMA 110 needs to send a message to the proxy NAS server 128 in the format "/<target NAS server name>/<file system name>" (for example, "/nas1/fs1"), to back up the file system fs1 served by the NAS server named "nas1". After extracting the name "nas1" of the target NAS server from the backup path, the working context of the backup operation will be switched to the target NAS server "nas1" so that the backup operation may access the corresponding file system in the target NAS server. All remaining operations will be done in the context of the target NAS server. For example, a snapshot will be created on the target file system and backup I/O will be initiated onto it, just as the DMA is connected directly to the IP address of target NAS server Further referring to FIG. 5, at 504, the working context of the backup operation is set to "nas1", and a successful response is returned to the DMA 110 at 506. At 508, the backup process starts, and the target NAS server backs up the file system or files to the tape library. During the backup process, whenever a directory or file backup is completed, the DMA 110 is notified through an NDMP message. At 510, a directory dir1 of files already backed up is notified; at 512, a file1 in the directory dir1 of files already backed up is notified, and at 514, a file2 in the directory dir1 of files already backed up is notified. In addition, after all files in the file path are backed up, at 516, the proxy NAS server 128 notifies the DMA 110 that the data backup process is completed.

FIG. 6 shows a schematic diagram 600 of file system recovery in a proxy mode according to embodiments of the present disclosure. At 602, the DMA 110 sends the proxy NAS server 128 a start recovery message "NDMP_STAR-T_RECOVER", which is a message used by the DMA to initiate a data recovery operation. The recover message may include a source path and a target path, and the target path indicates a target directory to which the data is to be recovered. When the NAS server 128 works in the proxy mode, it parses the target path in the same way as the backup operation, for example, a first portion of the backup path will be parsed as the name of the target NAS server. After the name of the target NAS server is successfully extracted, at 604, the proxy NAS server 128 switches the working context to the working context of the target NAS server so that all remaining operations will be completed in the context of the target NAS server. The remaining portion in the target path will be used as an actual target path within the target NAS server. At 606, a success response is returned to the DMA 110. At 608, the recovery process begins, and at 610 the DMA 110 is notified of the completion of the data recovery after the recovery is completed.

In addition, the solution according to embodiment of the present disclosure may also be compatible with the traditional method. For example, the recovery method according to embodiment of the present disclosure may also be recovered directly to the target NAS server without via the proxy NAS server.

FIG. 7 shows a schematic diagram 700 for recovering a file to a target server directly according to embodiments of the present disclosure. At 702, the DMA 110 directly sends a start recovery message "NDMP_START_RECOVER" to the target NAS server 127, where the target recovery path only includes the file path inside the NAS without including the name of the target NAS server. Therefore, the NAS server will handle the request directly and return a success response to the DMA 110 at 704. Then, the recovery process starts at 706, and at 708 the DMA 110 is notified of the completion of the data recovery after the recovery is completed.

Therefore, the backup completed by the proxy NAS server can be recovered to the target NAS server directly, that is, directly connected to the target NAS server. If the user wants to recover data to an earlier version of the storage system or a storage system without a proxy NAS server being set, he/she may also perform data recovery directly, thereby ensuring the compatibility. In this scenario, the target path follows the file system hierarchy in traditional NAS servers, that is, there is no prefix of the NAS server name in the target path. The example in FIG. 7 may be a case that a backup is done on a replicated NAS server with proxy NAS setup while data is recovered to the production site by connecting directly to the production NAS server Therefore, embodiments of the present disclosure propose a method for improving backup efficiency of a storage system. According to the method, it is possible to drastically simplify the backup configuration of the storage system by defining a new working mode and a consolidated/virtual file system hierarchy for file system backup/recovery operations in NAS server, which enables customers to configure a single NDMP access point in one SP to backup all file systems in that SP.

Figure 8:
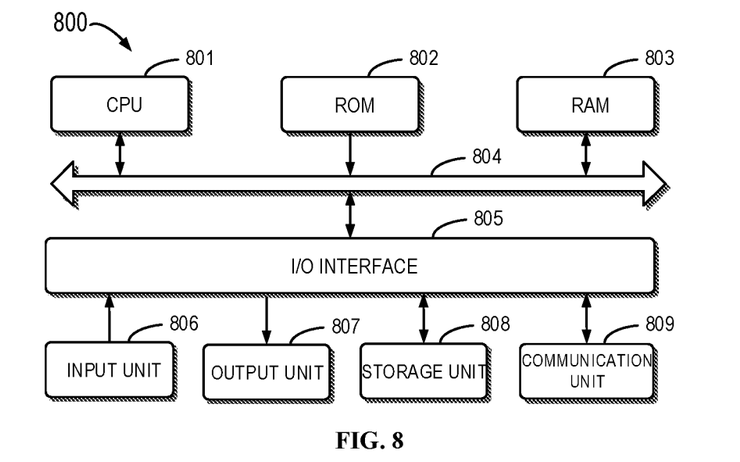
FIG. 8 shows a schematic block diagram of a device that may be used to implement embodiments of the present disclosure.

FIG. 8 shows a schematic block diagram of a device 800 that may be used to implement embodiments of the present disclosure. The device 800 may be the device or apparatus described in embodiments of the present disclosure. As shown in FIG. 8, the device 800 includes a central processing unit (CPU) 801 that may perform various appropriate actions and processing based on computer program instructions stored in a read-only memory (ROM) 802 or computer program instructions loaded from a storage unit 808 to a random access memory (RAM) 803. In the RAM 803, there further store various programs and data needed for operations of the device 800. The CPU 801, ROM 802 and RAM 803 are connected to each other via a bus 804. An input/output (I/O) interface 805 is also connected to the bus 804.

Various components in the device 800 are connected to the I/O interface 805, including: an input unit 806 such as a keyboard, a mouse and the like; an output unit 807 including various kinds of displays and a loudspeaker, etc.; a storage unit 808 including a magnetic disk, an optical disk, and etc.; a communication unit 809 including a network card, a modem, and a wireless communication transceiver, etc. The communication unit 809 allows the device 800 to exchange information/ data with other devices through a computer network such as the Internet and/or various kinds of telecommunications networks.

Various processes and processing described above may be executed by the processing unit 801. For example, in some embodiments, the method may be implemented as a computer software program that is tangibly embodied on a machine readable medium, e.g., the storage unit 808. In some embodiments, part or all of the computer programs may be loaded and/or mounted onto the device 800 via ROM 802 and/or communication unit 809. When the computer program is loaded to the RAM 803 and executed by the CPU 801, one or more steps of the method as described above may be executed.

In some embodiments, the method and process described above may be implemented as a computer program product. The computer program product may include a computer readable storage medium which carries computer readable program instructions for executing aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

These computer readable program instructions may be provided to a processing unit of a general purpose computer, special purpose computer, or other programmable data processing apparatus to produce a machine, such that the instructions, which execute via the processor of the computer or other programmable data processing apparatus, create means (e.g., specialized circuitry) for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for backing up data, comprising:
receiving, by a proxy server and from an application, a backup request comprising a backup path;
determining, by the proxy server, a target server associated with the backup request according to the backup path, the proxy server and the target server sharing the same storage processor; and
enabling to back up a file in the target server associated with the backup path;
wherein the proxy server is a proxy network-attached storage (NAS) server; and
wherein determining the target server includes:
identifying, as the target server, a NAS server that is different from the proxy NAS server, the NAS server and the proxy NAS server concurrently residing on the same storage processor.

2. The method according to claim 1 wherein the same storage processor runs a plurality of NAS servers which includes the NAS server and the proxy NAS server; and
wherein the method further comprises:
prior to receiving the backup request, setting one of the plurality of NAS servers running on the same storage processor as the proxy server to receive the backup request from the application.

3. The method according to claim 1, further comprising configuring a proxy mode flag of the proxy server to indicate that the proxy server enables the proxy mode; and
configuring a proxy mode flag of the target server to indicate that the target server disables the proxy mode.

4. The method according to claim 1, further comprising:
receiving, by the proxy server and from the application, a request for obtaining available file system information; and
returning, from the proxy server to the application, a list of all file systems in the storage processor in which the proxy server resides.

5. The method according to claim 4, wherein enabling to back up a file in the target server associated with the backup path comprises:
backing up the file from the target server to a tape library; and
in accordance with determining completion of the backup of the file, sending, from the proxy server to the application, a notification of successful backup of the file.

6. The method according to claim 5, further comprising:
receiving, by the proxy server and from the application, a recovery request comprising a source path and a target path;
determining, by the proxy server, a target server to which the recovery request is directed according to the target path; and
causing the target server to recover the file from the tape library.

7. The method according to claim 1, wherein receiving the backup request comprises:
receiving the backup request from a Data Management Application (DMA) based on a Network Data Management Protocol (NDMP).

8. The method according to claim 1, further comprising:
receiving, by the proxy server and from the application, a second backup request comprising a second backup path;
determining, by the proxy server, a second target server associated with the second backup request according to the second backup path; and
enabling to back up a file in the second target server associated with the second backup path.

9. A storage system, comprising:
a processing unit; and
a memory coupled to the processing unit and storing instructions thereon, the instructions, when executed by the processing unit, performing the acts of:
receiving, by a proxy server and from an application, a backup request comprising a backup path;
determining, by the proxy server, a target server associated with the backup request according to the backup path, the proxy server and the target server sharing the same storage processor; and
enabling to back up a file in the target server associated with the backup path;
wherein the proxy server is a proxy network-attached storage (NAS) server; and
wherein determining the target server includes:
identifying, as the target server, a NAS server that is different from the proxy NAS server, the NAS server and the proxy NAS server concurrently residing on the same storage processor.

10. The system according to claim 9, wherein determining the target server associated with the backup request comprises:
extracting a name of the target server and a file path in the target server based on the backup path and a predetermined format rule; and
switching a working context to the target server based on the name of the target server.

11. The system according to claim 9, further comprising configuring a proxy mode flag of the proxy server to indicate that the proxy server enables the proxy mode; and
configuring a proxy mode flag of the target server to indicate that the target server disables the proxy mode.

12. The system according to claim 9, the acts further comprising:
receiving, by the proxy server and from the application, a request for obtaining available file system information; and
returning, from the proxy server to the application, a list of all file systems in the storage processor in which the proxy server resides.

13. The system according to claim 12, wherein enabling to back up a file in the target server associated with the backup path comprises:
backing up the file from the target server to a tape library; and
in accordance with determining completion of the backup of the file, sending, from the proxy server to the application, a notification of successful backup of the file.

14. The system according to claim 13, the acts further comprising:
receiving, by the proxy server and from the application, a recovery request comprising a source path and a target path;
determining, by the proxy server, a target server to which the recovery request is directed according to the target path; and
causing the target server to recover the file from the tape library.

15. The system according to claim 9, wherein receiving the backup request comprises:
receiving the backup request from a Data Management Application (DMA) based on a Network Data Management Protocol (NDMP).

16. The system according to claim 9, the acts further comprising:
receiving, by the proxy server and from the application, a second backup request comprising a second backup path;
determining, by the proxy server, a second target server associated with the second backup request according to the second backup path; and
enabling to back up a file in the second target server associated with the second backup path.

17. The system according to claim 9 wherein the same storage processor runs a plurality of NAS servers which includes the NAS server and the proxy NAS server; and
wherein the method further comprises:

prior to receiving the backup request, setting one of the plurality of NAS servers running on the same storage processor as the proxy server to receive the backup request from the application.

18. A method for backing up data, comprising:

receiving, by a proxy server and from an application, a backup request comprising a backup path;

determining, by the proxy server, a target server associated with the backup request according to the backup path, the proxy server and the target server sharing the same storage processor; and enabling to back up a file in the target server associated with the backup path;

wherein determining the target server associated with the backup request comprises:

extracting a name of the target server and a file path in the target server based on the backup path and a predetermined format rule; and switching a working context to the target server based on the name of the target server.

19. A computer program product having a non-transitory computer readable medium which stores a set of instructions to backup data; the set of instructions, when carried out by computerized circuitry, causing the computerized circuitry to perform a method of:

receiving, by the computerized circuitry and from an application, a backup request comprising a backup path;

determining, by the computerized circuitry, a target server associated with the backup request according to the backup path, the computerized circuitry and the target server sharing the same storage processor; and enabling to backup a file in the target server associated with the backup path;

wherein the computerized circuitry is a proxy network-attached storage (NAS) server; and wherein determining the target server includes:

identifying, as the target server, a NAS server that is different from the proxy NAS server, the NAS server and the proxy NAS server concurrently residing on the same storage processor.

20. A method for backing up data, comprising:

receiving, by a proxy server and from an application, a backup request comprising a backup path;

determining, by the proxy server, a target server associated with the backup request according to the backup path, the proxy server and the target server sharing the same storage processor; and enabling to back up a file in the target server associated with the backup path;

wherein the same storage processor runs network-attached storage (NAS) servers configured to provide access to file systems having the same name; and wherein the method further comprises:

prior to receiving the backup request, configuring one of the NAS servers running on the same storage processor to operate as a proxy NAS server to unambiguously address the file systems having the same name using name prefixes.

\* \* \* \* \*